H. HELFENBEIN.
SIGNAL DEVICE FOR AUTOMOBILES OR OTHER VEHICLES.
APPLICATION FILED AUG. 29, 1918.
1,298,205.  
Patented Mar. 25, 1919.
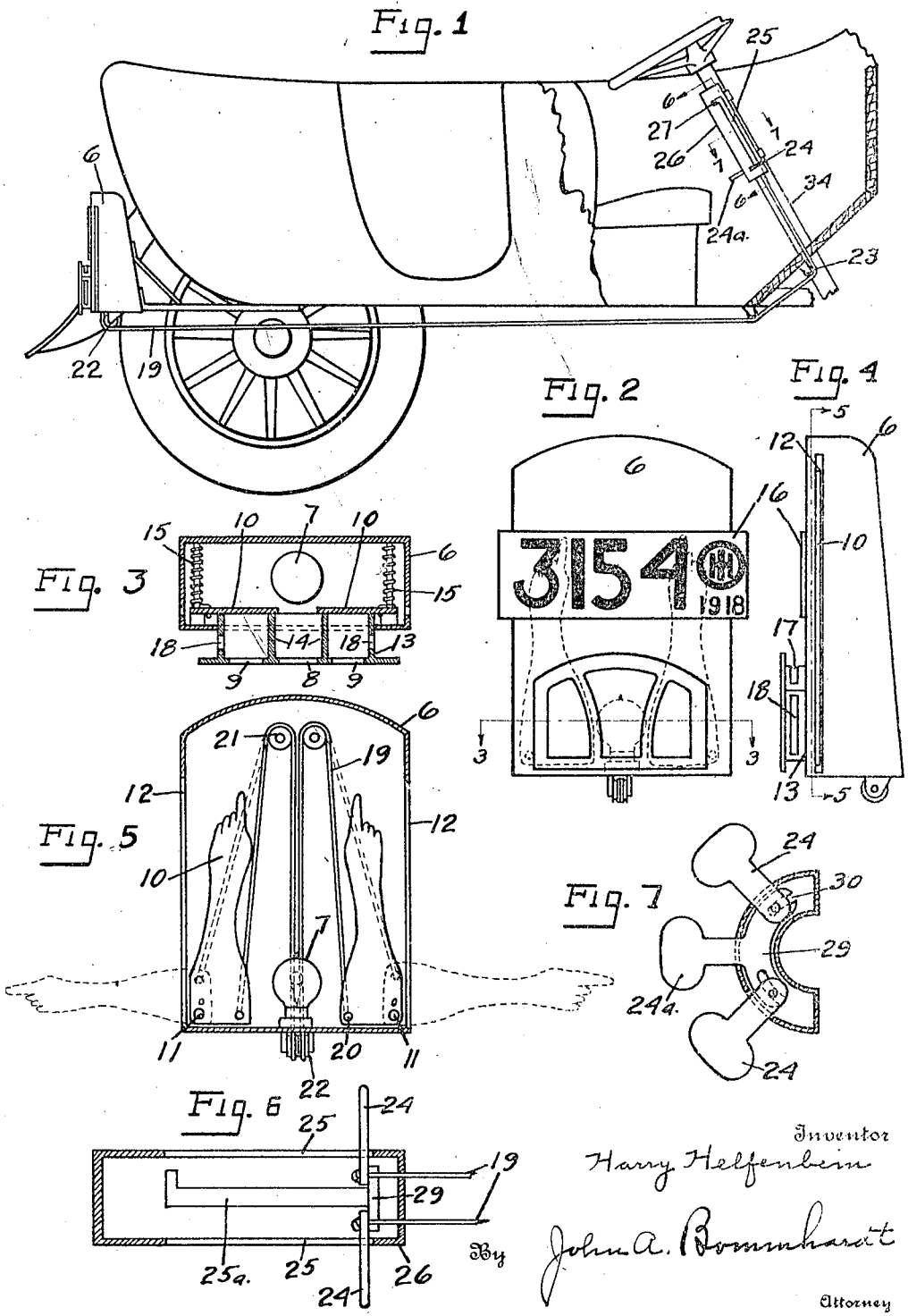

UNITED STATES PATENT OFFICE.

HARRY HELFENBEIN, OF CLEVELAND, OHIO.

SIGNAL DEVICE FOR AUTOMOBILES OR OTHER VEHICLES.

1,298,265.   Specification of Letters Patent.   Patented Mar. 25, 1919.

Application filed August 29, 1918.   Serial No. 251,945.

*To all whom it may concern:*

Be it known that I, HARRY HELFENBEIN, a citizen of Russia, residing at Cleveland, in the county of Cuyahoga and State of Ohio, have invented certain new and useful Improvements in Signal Devices for Automobiles or other Vehicles, of which the following is a specification.

This invention relates to signals for automobiles or other vehicles and has for its object to provide an improved signal consisting of a lamp box having swinging arms which may be operated by devices controlled by the driver for the purpose of indicating a change of direction or other intended action of the vehicle. The construction is such that a single lamp furnishes the illumination for a tail light and two signal lights, and for the swinging arms or hands, the latter being so arranged as to obscure all of the lights except the tail light, except when the arms are swung out to indicate an intended movement.

The invention will be more clearly understood from the following description and the accompanying drawings.

In the drawings, Figure 1 is a partial side view of an automobile provided with the invention. Fig. 2 is an elevation of the lamp box. Fig. 3 is a section on the line 3—3 of Fig. 2. Fig. 4 is a side elevation of the lamp box. Fig. 5 is a section on the line 5—5 of Fig. 4. Fig. 6 is a section on the line 6—6 of Fig. 1. Fig. 7 is a section on the line 7—7 of Fig. 1.

Referring specifically to the drawings, 6 indicates a lamp box mounted upon some convenient bracket at the back of the vehicle. 7 is a lamp in the box, and when lighted this lamp shines at all times through the middle glass 8 in the wall of the box. This glass or lens may be green and forms a tail light. At each side of this middle glass is a glass or lens 9, which may be red, and the illumination of which is controlled by one of a pair of arms 10. Each of these arms is pivoted as indicated at 11 in the lower corner of the box, in position to swing up into the box shown in Fig. 5, or to swing down and out through the slot 12 in the side wall of the box, as shown in dotted lines in Fig. 5. The arms are so located that when they are swung up they cover the passages or compartments leading to the lenses 9, as appears in Fig. 3, so that the light is cut off from said lenses. The lenses are carried in an extension casing 13 projecting from the rear face of the box, this casing being divided by partitions 14 into passages leading to the respective lenses, and the interior of the box and passages may be coated with some reflecting substance. Coiled springs 15 are connected to the arms 10 and act to normally lift the same to upright position, with the red lights 9 cut off, as shown in Figs. 3 and 5. A license tag 16 may be fastened to the face of the box and is adapted to be illuminated by light shining through a slot 17 in the extension 13 referred to. Said extension also has slots 18 permitting the passage of light to illuminate the arms 10 when they are swung down. When the arms are swung down they uncover the passages leading to the lenses 9 so that the light shines through one or both of said lenses and illuminates the same, thereby indicating an intended movement.

The arms may be operated by any suitable means. I have disclosed a pair of cords 19 connected to the arms at 20, so as to swing them on the pivots 11. These cords pass over guide pulleys 21, 22, and 23 to the steering post 34 of the vehicle and are connected respectively to operating devices. Each cord is connected to a hand piece 24 which extends through a slot 25 in a casing 26 fixed to the steering post in convenient position for operation. Either hand piece 24 may be pulled up in its slot 25 to swing the corresponding arm, and the slot is offset at its upper end as indicated at 27 so that the hand piece may be caught in the offset and the arm held in extended position. To operate both arms simultaneously I provide a third hand piece 24ª which extends through a similar slot 25ª in the casing 26 and projects from an arc-shaped plate 29 which works in the casing 26 and engages under the arms 24, the cords passing through slots 30 in the ends of the plate 29. Accordingly, when the arm 24ª is pulled up, it will carry with it the two arms 24, and thus both cords will be pulled and both arms 10 will be swung down and both lenses 9 will be illuminated.

The operating devices just described, instead of being mounted on the steering post, may be mounted on the dash board or any convenient part of the machine.

When the arm 10 at the right is swung down and the right hand lens 9 is illuminated, a turn to the right will be indicated, and when the left hand light is similarly illuminated, a turn to the left will be indicated. When both red lenses are illuminated, a stop will be indicated. The green lens 8, as stated, remains illuminated at all times.

The invention is not limited to the special devices shown and described, but various modifications are possible within the scope thereof.

I claim:

A signal comprising a box having a compartment containing a lamp, and slots in the side walls of the box, an extension casing projecting from the rear face of the box, said extension casing having partitions dividing the same into a plurality of passages, lenses in said passages, arms pivoted at their lower corners near the bottom of the box and arranged to swing through said slots to upright position within the box or horizontal position outside of the box, said arms being located between the box and the inner ends of the passages when in upright position, to cut off light from the latter, and the passages having slots in the side walls thereof through which light may pass to illuminate the arms when they are swung out.

In testimony whereof, I do affix my signature in presence of two witnesses.

HARRY HELFENBEIN.

Witnesses:
 JOHN A. BOMMHARDT,
 G. W. ROSENBERG.